United States Patent
Yang et al.

(10) Patent No.: US 11,871,379 B2
(45) Date of Patent: Jan. 9, 2024

(54) TECHNIQUES FOR ENHANCED RESOURCE SENSING IN SIDELINK COMMUNICATION

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 17/341,363

(22) Filed: Jun. 7, 2021

(65) Prior Publication Data

US 2022/0394673 A1 Dec. 8, 2022

(51) Int. Cl.
| | |
|---|---|
| *H04W 74/08* | (2009.01) |
| *H04W 72/02* | (2009.01) |
| *H04B 17/318* | (2015.01) |
| *H04L 27/26* | (2006.01) |
| *H04W 72/0453* | (2023.01) |
| *H04W 72/20* | (2023.01) |

(52) U.S. Cl.
CPC .......... *H04W 72/02* (2013.01); *H04B 17/318* (2015.01); *H04L 27/2607* (2013.01); *H04W 72/0453* (2013.01); *H04W 72/20* (2023.01)

(58) Field of Classification Search
CPC . H04W 72/02; H04W 72/0453; H04W 72/20; H04W 74/0808; H04W 76/14; H04B 17/318; H04L 27/2607; H04L 5/0044; H04L 5/0062; H04L 5/14
See application file for complete search history.

(56) References Cited

U.S. PATENT DOCUMENTS

| | | | |
|---|---|---|---|
| 2020/0229112 A1 | 7/2020 | John Wilson et al. | |
| 2020/0336253 A1* | 10/2020 | He | H04W 4/40 |
| 2022/0216956 A1* | 7/2022 | Yoshioka | H04L 1/189 |

FOREIGN PATENT DOCUMENTS

EP  3672338 A1  6/2020

OTHER PUBLICATIONS

Castañeda et al., "A Tutorial on 5G NR V2X Communications", Feb. 2021, IEEE (Year: 2021).*
International Search Report and Written Opinion—PCT/US2022/071839—ISA/EPO—dated Jul. 12, 2022.

(Continued)

*Primary Examiner* — Jae Y Lee
*Assistant Examiner* — Aixa A Guadalupe Cruz
(74) *Attorney, Agent, or Firm* — Patterson + Sheridan. L.L.P.

(57) ABSTRACT

Certain aspects of the present disclosure provide techniques for requesting inter-UE coordination messages for sidelink communications. An example method for wireless communications by a first user equipment (UE) generally includes sending a sidelink communication on a first set of one or more subchannels in a first slot of sidelink resource pool, performing channel sensing on a second set of one or more subchannels in the first slot, and selecting one or more resources for a subsequent sidelink communication in at least a second slot of the sidelink resource pool on the channel sensing.

30 Claims, 13 Drawing Sheets

(56) References Cited

OTHER PUBLICATIONS

Nokia, et al., "V2X UE Capabilities—Ultimate View", 3GPP Draft, R2-1705400, 3GPP, Mobile Competence Centre, 650, Route Des Lucioles, F-06921 Sophia-Antipolis Cedex, France, vol. RAN WG2, No. Hangzhou, China, May 15, 2017-May 19, 2017, 2 Pages, May 14, 2017, XP051275809, URL:http://www.3gpp.org/ftp/Meetings_3GPP_SYNC/RAN2/Docs/ [retrieved on May 14, 2017], Section 2.4.

SAMSUNG: "System Level Evaluations for NR V2X Sidelink Resource Allocation", 3GPP Draft, R1-1906937, 3GPP, Mobile Competence Centre, 650, Route Des Lucioles, F-06921 Sophia-Antipolis Cedex, France, vol. RAN WG1, No. Reno, USA; May 13, 2019-May 17, 2019, 6 Pages, May 13, 2019, XP051728387, URL:http://www.3gpp.org/ftp/Meetings%6F3GPP%5FSYNC/RAN1/Docs/R1%2D1906937%2Ezip [retrieved on May 13, 2019], Section 2, Candidate Resource Allocation Mechanisms.

Zang J., et al., "An Adaptive Full-Duplex Deep Reinforcement Learning-Based Design for 5G-V2X Mode 4 VANETs", 2021 IEEE Wireless Communications and Networking Conference, IEEE, Mar. 29, 2021, pp. 1-6, XP033908895, DOI: 10.1109/WCNC49053.2021.9417550 [Retrieved on Apr. 27, 2021] p. 3, Section "A. FD Mode".

\* cited by examiner

TECHNIQUES FOR ENHANCED RESOURCE SENSING IN SIDELINK COMMUNICATION

BACKGROUND

Field of the Disclosure

Aspects of the present disclosure relate to wireless communications, and more particularly, to enhancements for device-to-device sidelink communication by leveraging unused sub channels to perform sensing.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE on a sidelink between the UEs (rather than on an uplink or downlink between a UE and base station). As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After reading the section entitled "Detailed Description" one will understand how the features of this disclosure provide advantages that include improved device-to-device communications in a wireless network.

Certain aspects of this disclosure are directed to a method for wireless communications by a first user equipment (UE). The method generally includes sending a sidelink communication on a first set of one or more subchannels in a first slot of sidelink resource pool, performing channel sensing on a second set of one or more subchannels in the first slot, and selecting one or more resources for a subsequent sidelink communication in at least a second slot of the sidelink resource pool based on the channel sensing.

Certain aspects of the present disclosure are directed to an apparatus for wireless communications by a first UE. The apparatus generally includes a memory and at least one processor coupled to the memory, the memory and the at least one processor being configured to output a sidelink communication for transmission on a first set of one or more subchannels in a first slot of sidelink resource pool, perform channel sensing on a second set of one or more subchannels in the first slot, and select one or more resources for a subsequent sidelink communication in at least a second slot of the sidelink resource pool based on the channel sensing.

Certain aspects of the present disclosure are directed to a first UE. The first UE generally includes a transmitter configured to transmit a sidelink communication on a first set of one or more subchannels in a first slot of sidelink resource pool, a memory and at least one processor coupled to the memory, wherein the memory and the at least one processor being configured to perform channel sensing on a second set of one or more subchannels in the first slot and select one or more resources for a subsequent sidelink communication in at least a second slot of the sidelink resource pool based on the channel sensing.

Certain aspects of the present disclosure are directed to an apparatus for wireless communications by a first UE. The apparatus generally includes means for outputting a sidelink communication for transmission on a first set of one or more subchannels in a first slot of sidelink resource pool, means for performing channel sensing on a second set of one or more subchannels in the first slot, and means for selecting one or more resources for a subsequent sidelink communication in at least a second slot of the sidelink resource pool based on the channel sensing.

Certain aspects of the present disclosure are directed to a computer readable medium having instructions stored thereon executable by an apparatus for outputting a sidelink communication for transmission on a first set of one or more subchannels in a first slot of sidelink resource pool, performing channel sensing on a second set of one or more subchannels in the first slot, and selecting one or more resources for a subsequent sidelink communication in at least a second slot of the sidelink resource pool based on the channel sensing.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
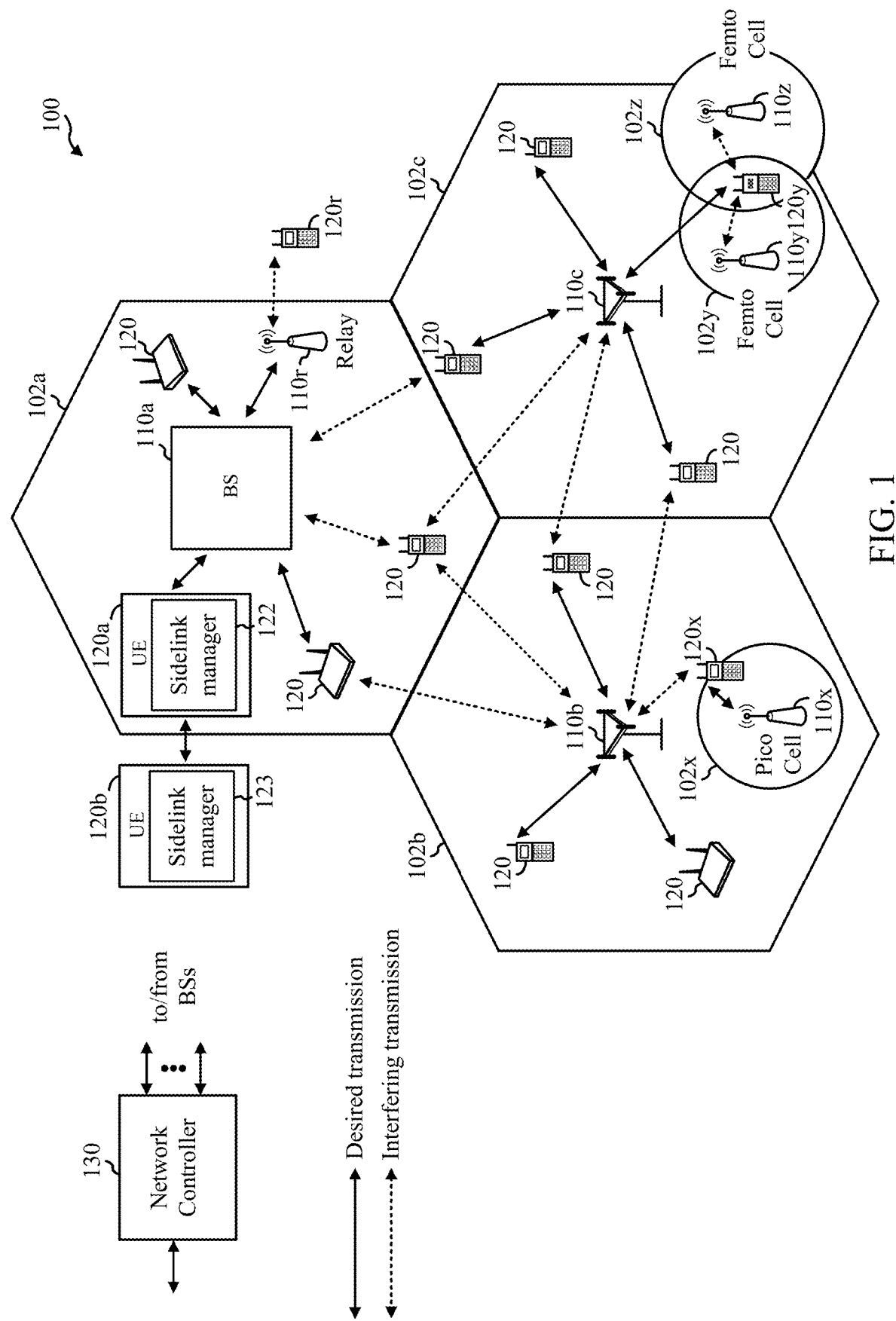
FIG. 1 is a block diagram conceptually illustrating an example telecommunications system, in accordance with certain aspects of the present disclosure.

Aspects of the present disclosure relate to wireless communications, and more particularly, to enhancements for device-to-device sidelink communication by leveraging unused sub channels to perform sensing by a sidelink UE in slots in which the sidelink UE also transmits.

For example, a first UE may send a sidelink transmission on a first set of subchannels in a first slot of sidelink resource pool, and perform channel sensing on a second set of subchannels in the same first slot. The first UE may then select resources for a subsequent sidelink transmission in a second slot based on the channel sensing in the original slot. For example, the first UE may exclude resource units (from a candidate set) that may be potentially reserved by a sidelink control information (SCI) detected in the first slot.

Allowing a UE to perform channel sensing in a transmission (Tx) slot may result in more efficient resource utilization. For example, in some cases, rather than exclude all resources from a Tx slot, a UE may only exclude resources for which the UE has not performed sensing over (instead of excluding all resources corresponding to the Tx slot).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, one or more UEs 120a and 120b of FIG. 1 may be configured to perform operations 1000 of FIG. 10 and/or to other operations described herein.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured to determine resources to use for sidelink communications (with another UE). As shown in FIG. 1, the UE 120a includes a sidelink manager 122. The sidelink manager 122 may be configured to transmit/receive a sidelink communication to/from another UE, in accordance with aspects of the present disclosure. As shown in FIG. 1, the UE 120b includes a sidelink manager 123. The sidelink manager 123 may be configured to receive/transmit a sidelink communication from/to another UE, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node such as a UE or a BS may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
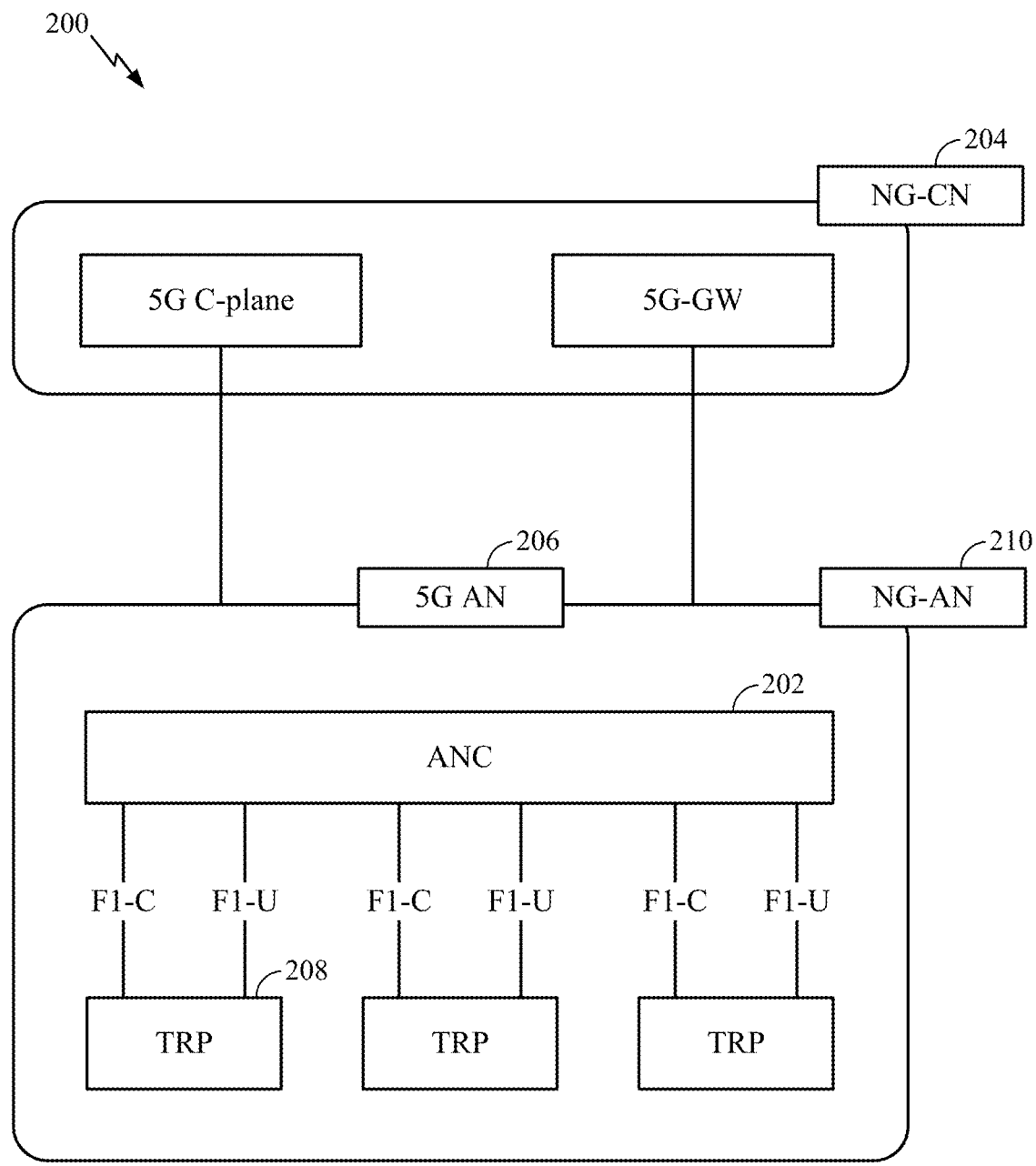
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
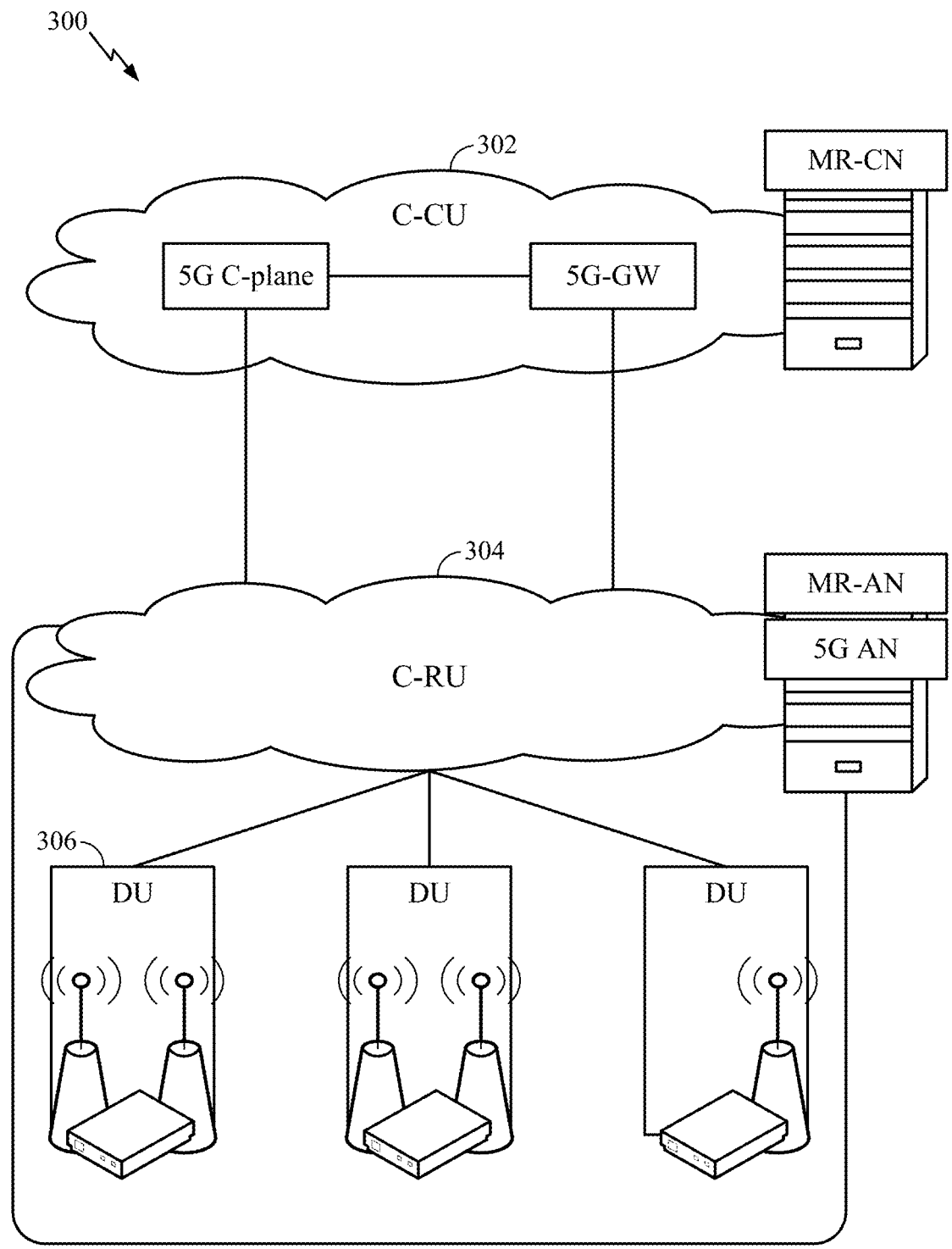
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
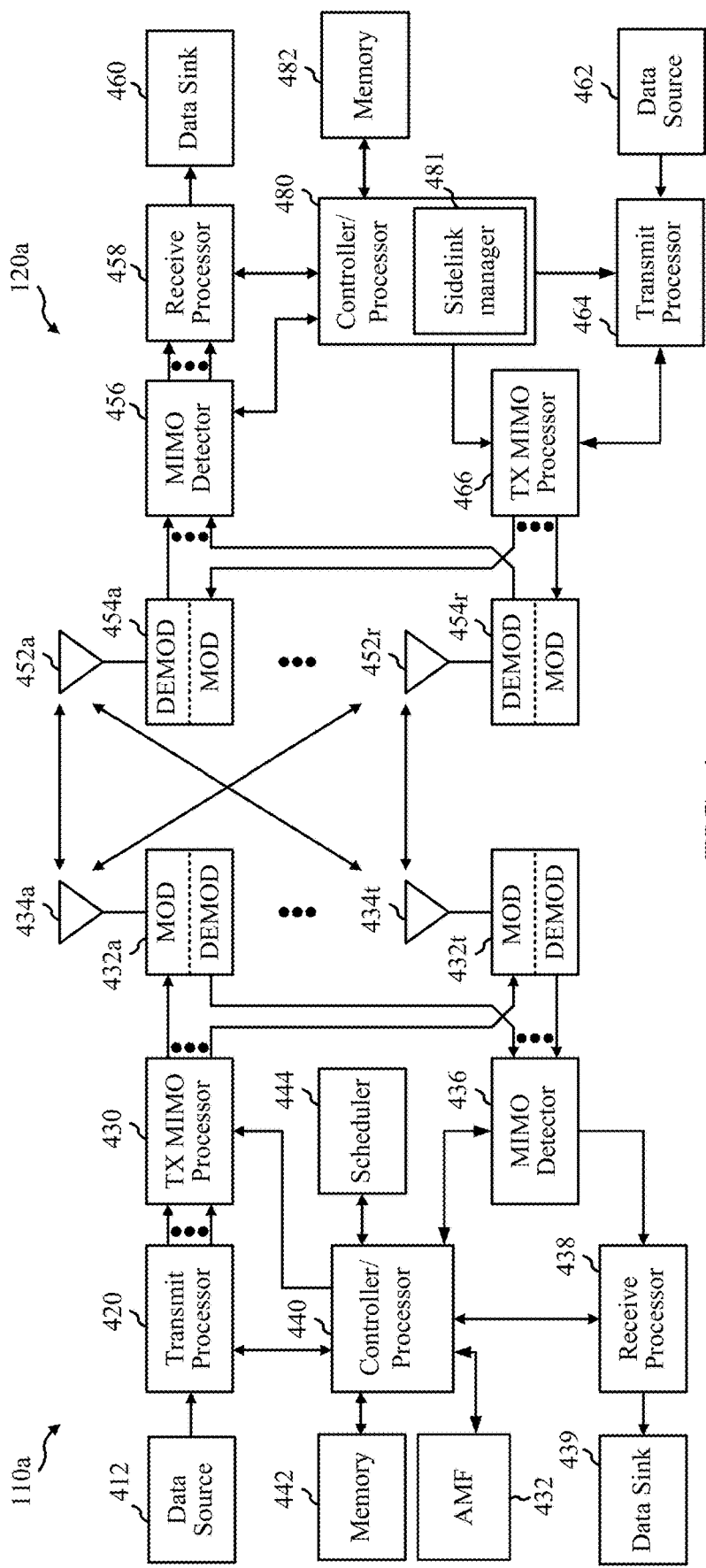
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a and/or UE 120b may be used to perform the various techniques and methods described herein with reference to FIG. 10.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. As shown in FIG. 4, the controller/processor 480 of the UE 120a has a sidelink manager 481 that may be configured to perform operations 1000 of FIG. 10 and/or operations 1100 of FIG. 11. Although shown at the controller/processor 480, other components of the UE 120a may be used performing the operations described herein. The memories 442 and 482 may store data and program codes for BS 110a and UE 120a, respectively. A scheduler 444 may schedule UEs for data transmission on the downlink, sidelink, and/or uplink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Example Sidelink Communications

Figure 5:
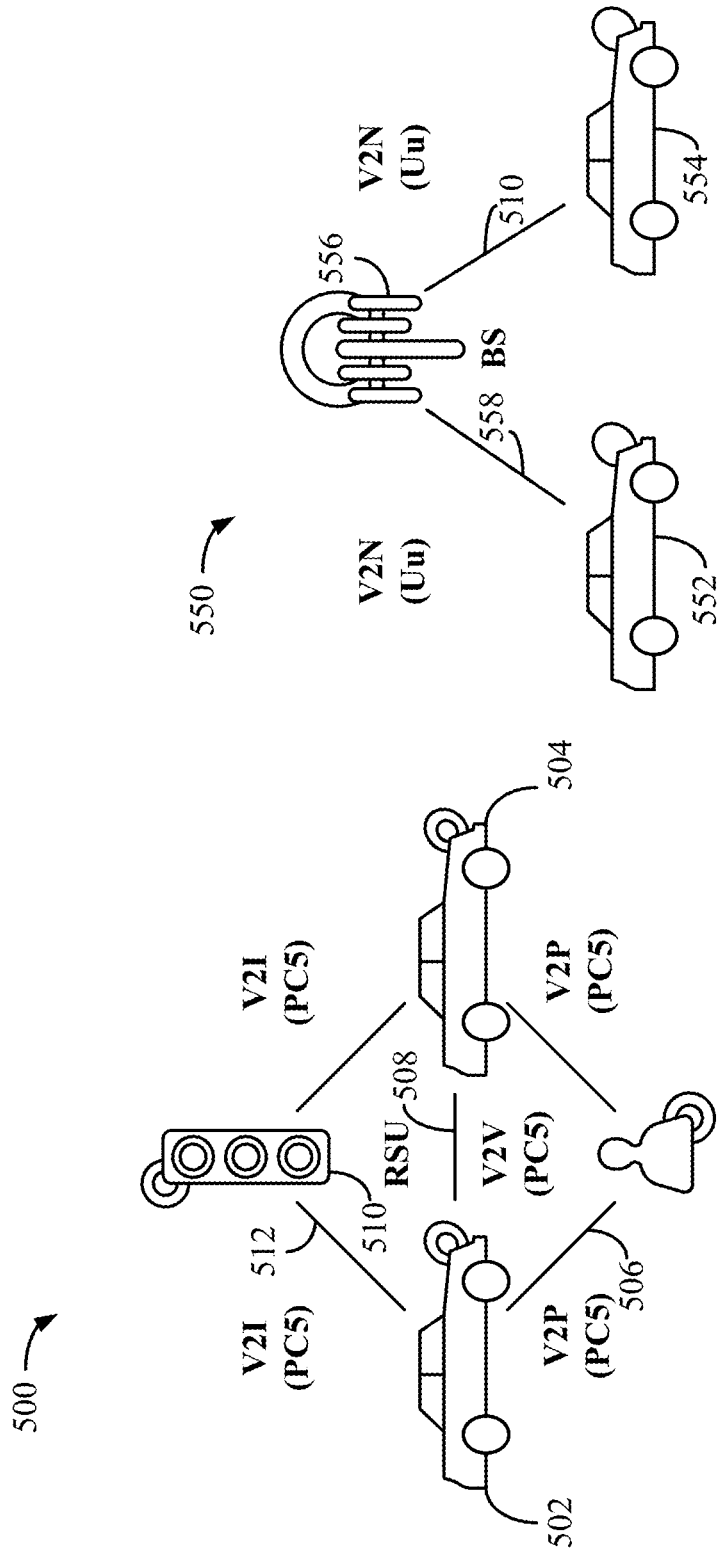
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode, shown by way of example in FIG. 5A, involves direct communications (for example, also referred to as side link communications, including transmissions by a Tx UE and/or receptions by a Rx UE) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/ weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE-A case where all the symbols in a slot are available for sidelink, as well as another case where only a subset of consecutive symbols in a slot is available for sidelink.

PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

As noted above, with reference to FIGS. 5A and 5B, sidelink generally refers to the link between two users, or user-relays can be used in different scenarios and for different applications. As previously described, when a UE is transmitting a sidelink communication on a sub-channel of a frequency band, the UE is typically unable to receive another communication (e.g., another sidelink communication from another UE) in the frequency band.

This system of sidelink transmissions and resource allocations is reservation-based in (NR) sidelink. In general, the resource allocation is delimited by units of sub-channels in the frequency domain and may be limited to one slot in the time domain. A (scheduled) transmission may reserve resources in a current slot and in up to two future slots, and the resource reservation information is carried by SCI. Reservations may be made in a window of 32 logical slots (e.g., 32 resource blocks distributed across the time-frequency domain).

Figure 6:
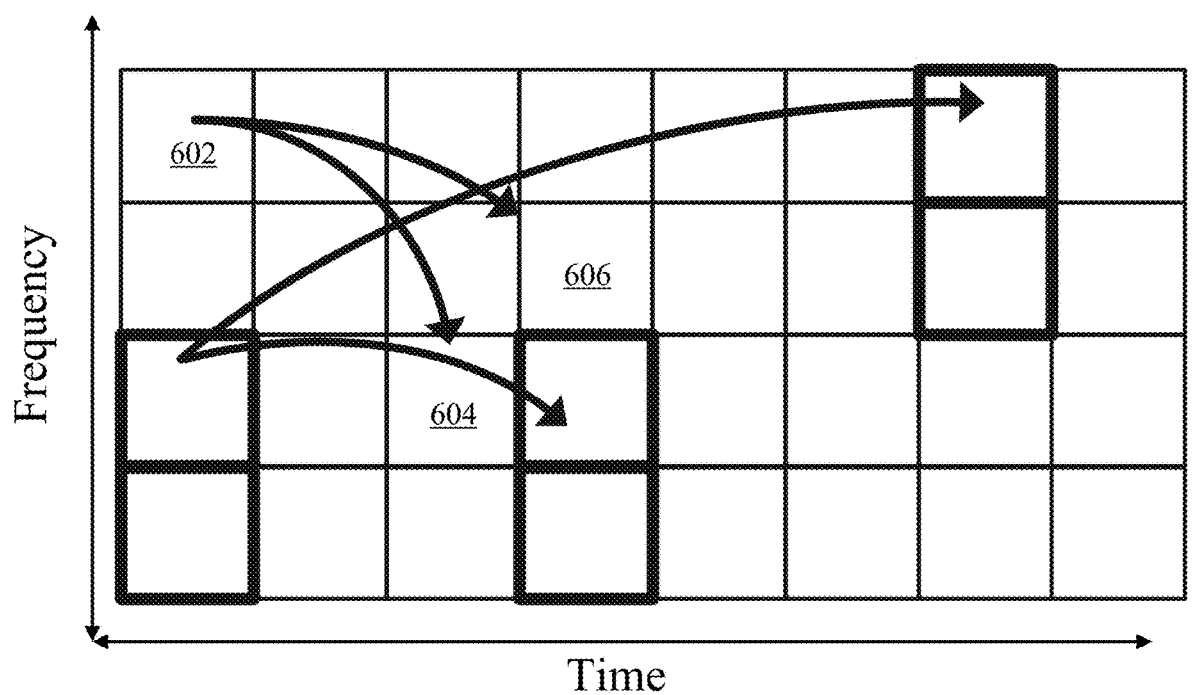
FIG. 6 illustrates an example allocation of aperiodic resources for sidelink communications, in accordance with certain aspects of the present disclosure.

For sidelink resource reservations, both aperiodic and periodic resource reservations can be supported and configured for sidelink communication. As shown in FIG. 6, which illustrates an example allocation of aperiodic resources for sidelink communications, SCI received by a UE may aperiodically schedule future resources. For example, as illustrated SCI 602 may schedule (future) transmissions 604, 606. In some cases, as shown, each SCI may reserve up to two future resources.

Figure 7:
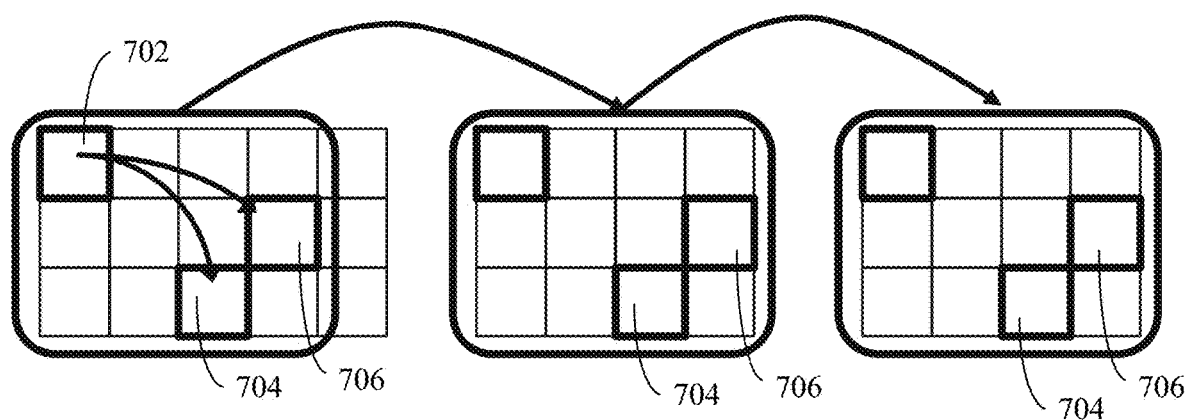
FIG. 7 illustrates an example allocation of periodic resources for sidelink communications, in accordance with certain aspects of the present disclosure.

FIG. 7 illustrates an example allocation of periodic resources for sidelink communications, in accordance with certain aspects of the present disclosure. As shown, SCI 702 reserves the same periodic resources 704, 706 in a set of subsequent slots (e.g., where the period can be a configurable value between 0ms and 1000 ms signaled in the SCI 702). In some cases, periodic resource reservation and signaling can be disabled by a (pre)configuration at the UE.

Example Resource Sensing for FD Sidelink

Certain aspects of the present disclosure provide techniques for sidelink communications. For example, enhancements for device-to-device sidelink communication by leveraging unused sub channels to perform sensing during slots in which both a communication and sensing is to occur. As used herein, a "communication" may be understood to mean a transmission and/or a reception, by a sidelink user equipment (UE), from/to another sidelink UE.

In current (e.g., new radio (NR)) vehicle-to-everything (V2X) mode 2 resource allocation, a UE that intends to transmit in a resource pool performs sensing and determines whether a resource can be used. For example, to make such a determination, the UE performs channel sensing to monitor for transmissions from other UEs. In other words, the UE may decode sidelink control information (SCI) from other UEs even if the UE is not to be the intended receiver of a particular transmission.

According to Mode-2 resource allocation (RA), a transmitter UE (TX-UE) senses within a (sliding) sensing window to detect resources, for example, indicated by future resource reservations. Information regarding future reservations may be obtained by decoding the SCIs in the sensing window. These future reservations may be checked for availability based on received signal levels in the sensing window. Within subset of available resources, within the resource selection window, one or more reservations made randomly. The time location of the resource selection window may be determined, for example, based on a remaining packet delay budget (PDB).

Figure 8:
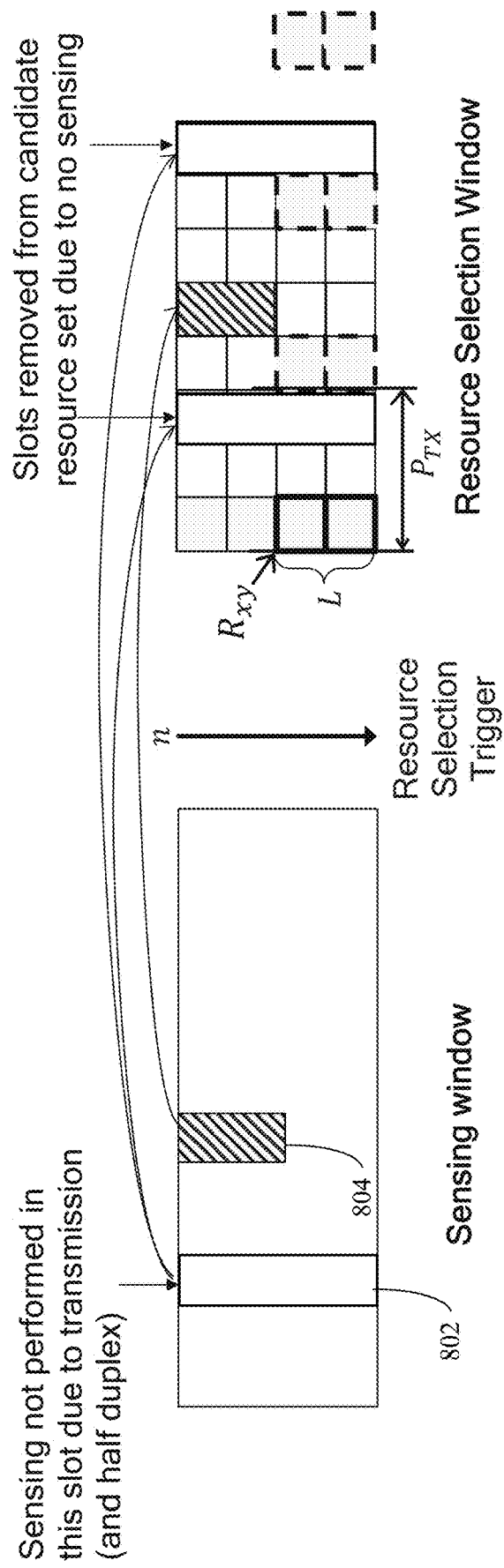
FIG. 8 illustrates an example sensing window and a resource selection window, in accordance with certain aspects of the present disclosure.

FIG. 8 illustrates an example sensing window and a resource selection window, in accordance with certain aspects of the present disclosure.

A UE may initialize a set $S_A$ as the set of all candidate single-slot resources in the resource selection window. In some cases, a UE may be triggered to perform resource selection in a slot n and, in response to the trigger, the UE may perform sensing based on previously stored samples (from prior slots).

In the illustrated example, the UE does not perform sensing in a slot 802 due to a transmission, but does perform sensing in another slot 804 (in which no transmission occurs).

In some cases, if the UE has not monitored/sensed a slot t (e.g., slot 802) in the sensing window (e.g., due to transmission in the slot and since the UE is communicating according to half duplex (HD)), the UE may exclude all resource units in the candidate set $S_A$ which may potentially be reserved by a SCI grant in slot t. This is shown in FIG. 8, where two slots are removed from the candidate resource set $S_A$ due to a lack of sensing for those resource units (e.g., corresponding to slot 802). Furthermore, this may be performed by taking into account all (pre)configured resource reservation periods.

For each remaining resource unit (i.e., $R_{xy} \in S_A$ that was not removed/excluded) the UE checks whether there exists an SCI detected in the sensing window that reserves a resource overlapping with $R_{xy}$ and/or any future candidates $R_{x,y+jP_{Tx}}$ (e.g., similar to the situation described above). In this case, j may be an integer and $P_{TX}$ may be a transmission periodicity (that is multiplied by j).

After checking whether there exists an SCI detected in the sensing window that reserves a resource overlapping with $R_{xy}$ and/or any future candidate(s) $R_{x,y+jP_{Tx}}$, the corresponding resource may be excluded from the set $S_A$ if the received reference signal received power (RSRP) exceeds some RSRP threshold. In some cases, the RSRP threshold depends on a priority of the reservation and/or the priority of a transmitted packet(s) from a UE.

However, in half duplex operation, if the UE transmits in a particular sidelink slot (slot n), the UE cannot receive anything in that same slot. Therefore, when deciding resource availability, the UE may remove resources in slot n+K, where K is some configured periodicity.

Full duplex (FD) communication was introduced as a means to provide greater bandwidth (e.g., double the bandwidth) by allowing a device to transmit and receive on the same set of resources (e.g., at the same time). However, due to its complications (e.g., self-interference between transmission and reception, inter-UE interference, etc.) and additional implementation complexity, sub-band FD (SBFD) can be considered as a first step to realize some of the ultimate benefits of FD communications, while circumventing/mitigating some of the complications of FD.

Figure 9A:
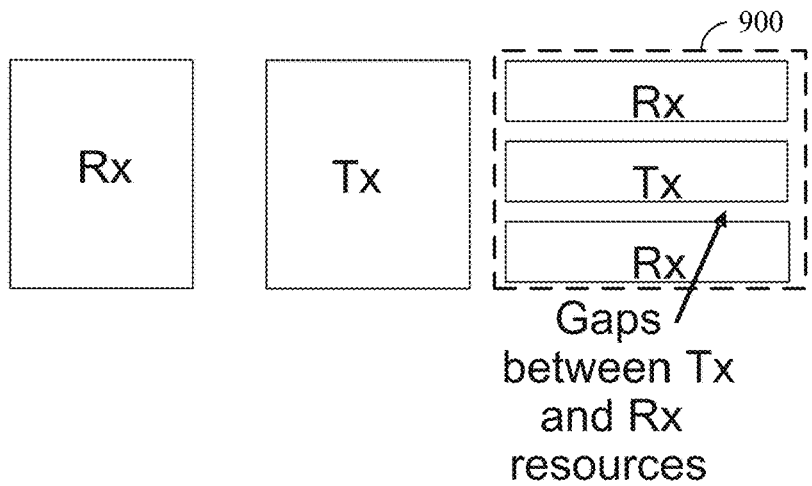
FIG. 9A illustrates an example sidelink resource configuration for full duplex (FD) communication, in accordance with certain aspects of the present disclosure.
Figure 9B:
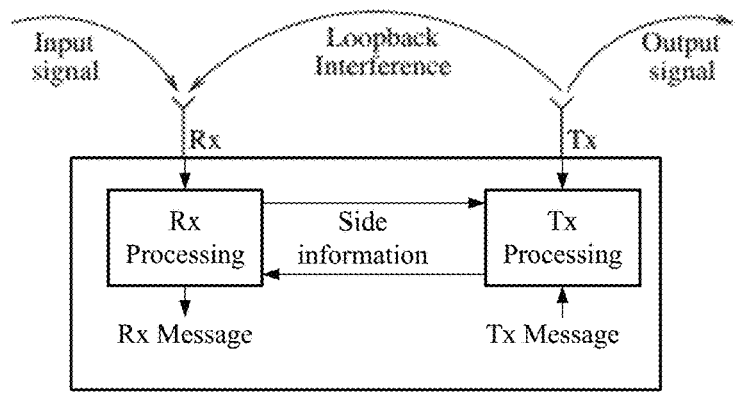
FIG. 9B illustrates example signal processing and interference during FD communication, in accordance with certain aspects of the present disclosure.

FIG. 9A illustrates an example set of resources 900 for SBFD with some gaps budgeted between transmission (Tx) and reception (Rx) resources. The gaps may help control self-interference caused by transmitting on one resource while receiving on a nearby (in frequency) at the same time. FIG. 9B illustrates how self (loopback) interference may occur between transmission and reception processing points on an FD device.

Figure 9C:
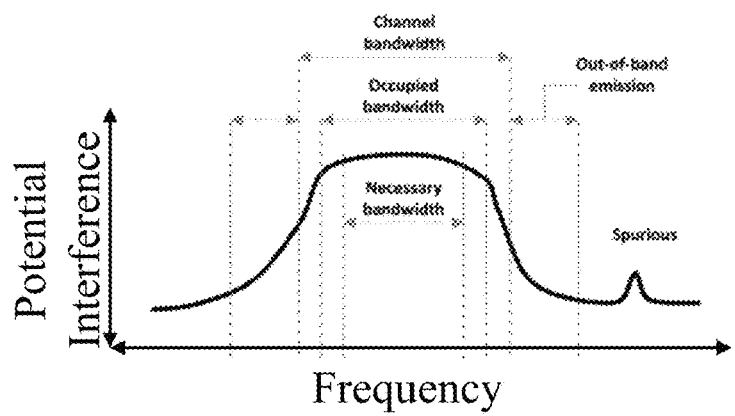
FIG. 9C illustrates an example spectrum emission graph of a transmitted signal, in accordance with certain aspects of the present disclosure.

In some cases, the gaps between Tx and Rx SBFD resources may be designed to ensure the out-of-band and spurious emissions caused by transmission on Tx resources occur outside of Rx SBFD resources. FIG. 9C is an example spectrum emission graph of a transmitted signal (e.g., during FD communication), that illustrates how out-of-band and spurious emissions may occur outside of channel bandwidth (e.g., for Tx SBFD resources). In some cases, a necessary bandwidth may be considered to determine a maximum co-channel interference level that is acceptable by the receiver, and an occupied bandwidth may be considered, for example, to determine in which part of the channel 99% of the transmitted power is to be concentrated. Thus, by selecting a necessary/occupied (e.g., smaller) bandwidth to be used for communication, and implementing gaps between transmission and reception resources, interference overall may be reduced since the resources can be spaced apart in the frequency domain.

As more capable UEs support SBFD, enhanced resource allocation algorithms may be desirable. Accordingly, aspects of the present disclosure provide enhancements for device-to-device sidelink communication by leveraging unused sub channels to perform sensing by a sidelink UE in slots in which the sidelink UE also transmits.

Figure 10:
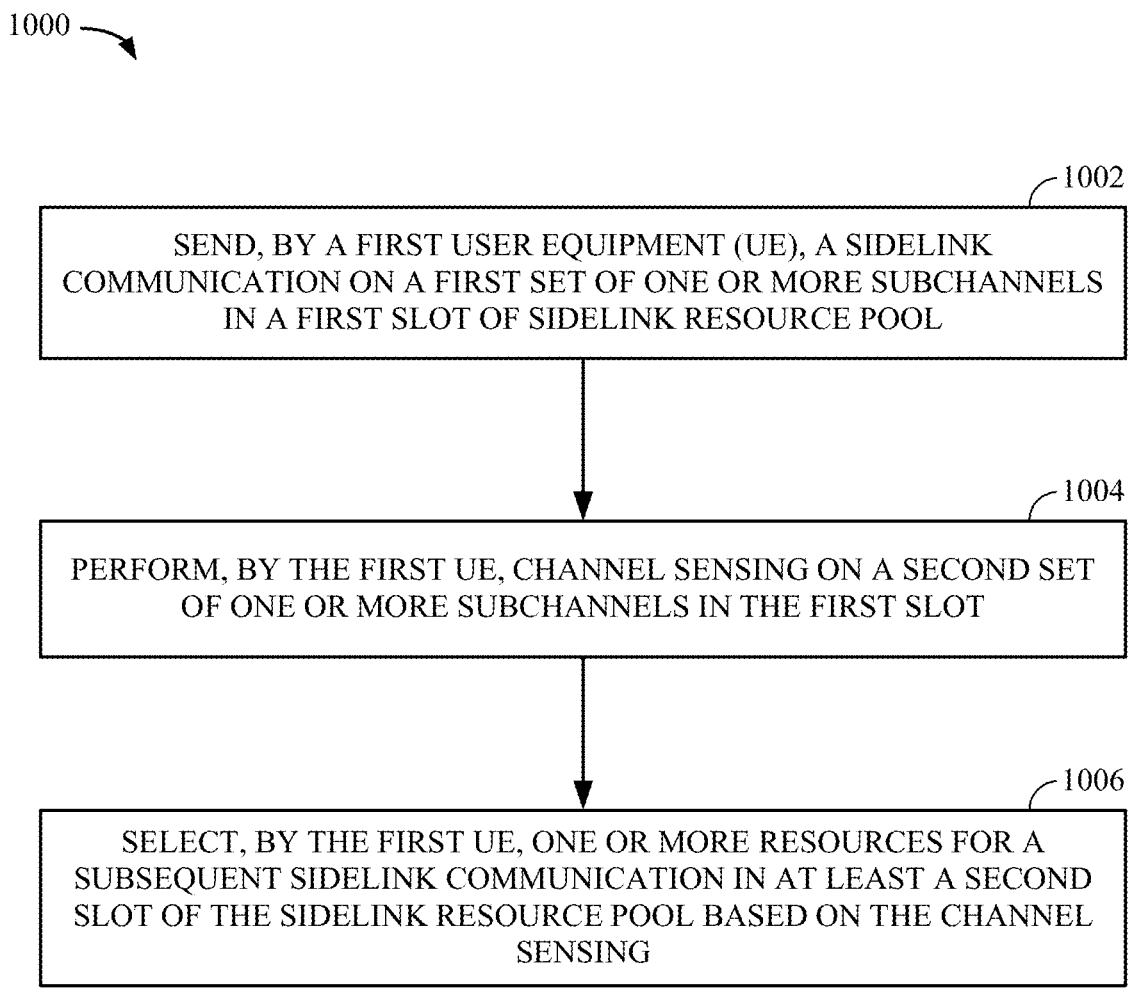
FIG. 10 illustrates example operations for wireless communications by a first UE, in accordance with certain aspects of the present disclosure.

FIG. 10 illustrates example operations 1000 for wireless communications by a first UE (e.g., a TX UE such as UE-B), in accordance with certain aspects of the present disclosure. For example, operations 1000 may be performed by a UE 120a of FIG. 1 and/or FIG. 4 when performing sidelink communications with another UE.

Operations 1000 begin, at 1002, by sending a sidelink communication (e.g., a transmission) on a first set of one or more subchannels in a first slot of sidelink resource pool. For example, a Tx UE may send a sidelink transmission in a slot within a sensing window, as described above with reference to FIG. 8

At 1004, the first UE performs channel sensing on a second set of one or more subchannels in the first slot. For example, the Tx UE may perform channel sensing resources, within the first slot, that were not used for the sidelink transmission in the first slot.

Figure 11:
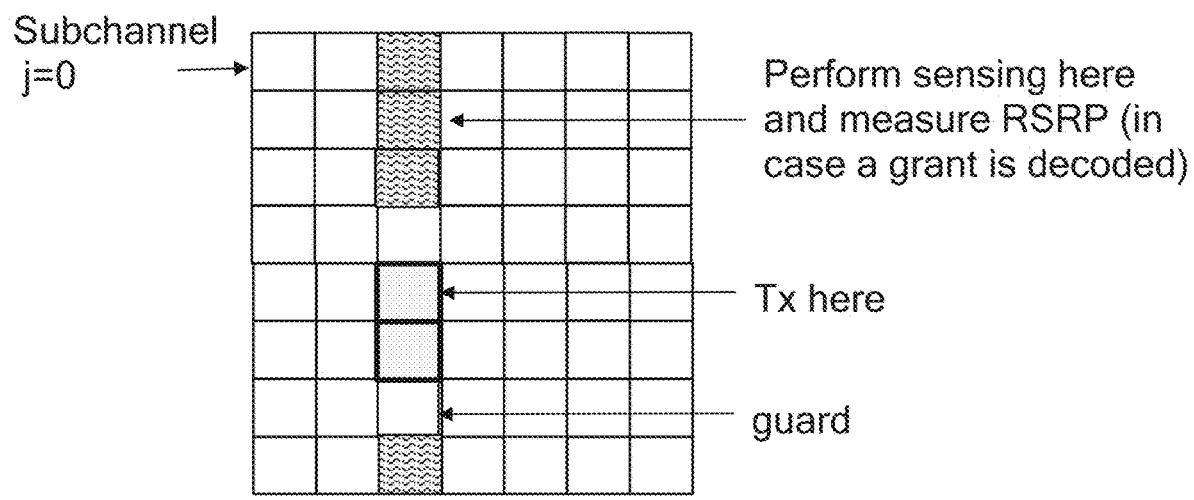
FIG. 11 illustrates an example resource configuration for duplex sidelink communications, in accordance with certain aspects of the present disclosure.

FIG. 11 illustrates how a UE may perform channel sensing within a slot for resources that are not used for a SL transmission or gaps. As shown, an FD-capable UE may perform sensing (e.g., receiving other UEs' SCIS, and measuring RSRP) on the unused subchannels while transmitting in the same slot, excluding the subchannels used as guard resources (gap resources).

Returning to FIG. 10, at 1006, the first UE selects one or more resources for a subsequent sidelink communication in at least a second slot of the sidelink resource pool based on the channel sensing.

Figure 12:
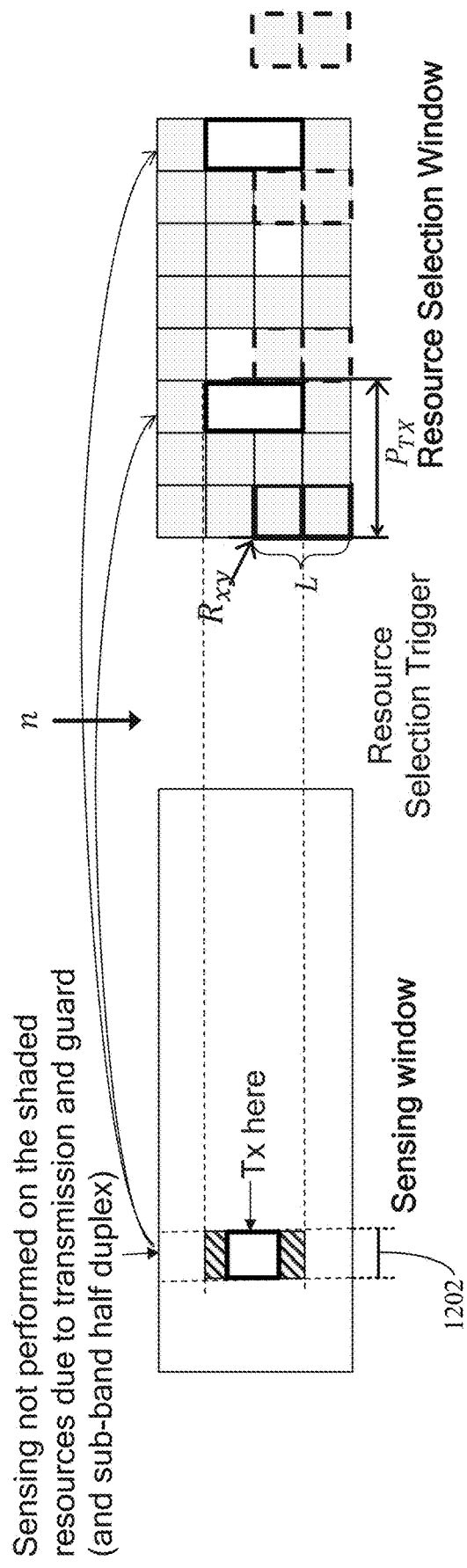
FIG. 12 illustrates an example sensing window with a sidelink transmission and a corresponding resource selection window, in accordance with certain aspects of the present disclosure.

For example, as illustrated in FIG. 12, the Tx UE may select resources within a resource selection window, by excluding resources for which channel sensing was not performed (e.g., Tx and gap resources) and/or by excluding resources reserved by SCI transmissions decoded during the channel sensing.

Since the scheduling unit over sidelink in the frequency domain may be one subchannel, the transmission/reception (Tx/Rx) gap can be one or more subchannels (e.g., with a minimum of 10 RBs per subchannel). In some cases, the length/size of the gap could be defined in a standard specification, and/or configured in the resource pool. In some cases, the UE may not measure RSRP on the subchannel(s) that overlaps with the guard subchannel.

To determine the resource availability for a resource allocation, a UE may determine to only exclude the resources that it has not performed sensing over (e.g., instead of excluding all resources corresponding to a slot having a communication). For example, referring to FIG. 12, slot 1202 may include a sidelink transmission surrounded by a guard band. Thus, when performing resource selection, the Tx UE may only exclude a portion of resources, such as the Tx and guard band resources for which channel sensing was not performed. For example, if a UE transmits an SL transmission in slot n on subchannel j, then the UE may treat subchannel j−1 and j+1 as guard bands, and exclude these subchannels (j−1, j, j+1) in slot n+K1, n+K2, . . . , n+KD from the resource selection window, where K1, K2, . . . , KD are the upper-layer configured periodicities.

In addition to the resources excluded because channel sensing was not performed, resources identified by conventional channel sensing may also be excluded.

For example, the UE may decode an SCI in a subchannel j outside the guard, but the granted resources may overlap with the guard subchannels or the subchannel used for communication (e.g., guard subchannel j+1 and communication in subchannel j+2). In this case, even though the UE may not measure RSRP of the guard subchannels and the subchannels used for the communication, the UE may assign the same RSRP as the RSRP of subchannel j (e.g., measured on a physical sidelink shared channel (PSSCH) or a physical sidelink control channel (PSCCH)) to those subchannels instead of excluding these subchannels from the potential resource set. This approach may allow the UE to utilize an existing (RSRP-based) resource selection algorithm to exclude the Tx and gap resources.

In certain aspects, for RSRP determination (by the UE), for the resources that occur in the same slot as the UE's communication, additional self-interference power from the measured RSRP may be subtracted. In this case, the self-interference power may depend on both the reception RB allocation and the transmit power of the UE itself. In some cases, the exact manner in which the UE "subtracts" the interference from the measured RSRP could be left to UE implementation/configuration. In other cases, wireless standards may be proposed and/or enacted to help ensure that the UE performs the interference subtraction correctly.

In some cases, the UE may use different RSRP threshold(s) for the various subchannels in the slot where the UE performs communication (e.g., as opposed to a conventional RSRP threshold that is used for slots without communication), to determine the resource availability. For example, the UE may use the conventional RSRP plus an offset of X dB ($RSRP_{THRESH}$+X dB), and may consider that the resource is occupied if the measured RSRP is above the "new" threshold.

As described herein, by utilizing FD capability of a UE to perform sensing on (otherwise) unused subchannels while transmitting in the same slot, sidelink discovery procedures can be improved to more smartly exclude/utilize resources.

Example Communications Devices

Figure 13:
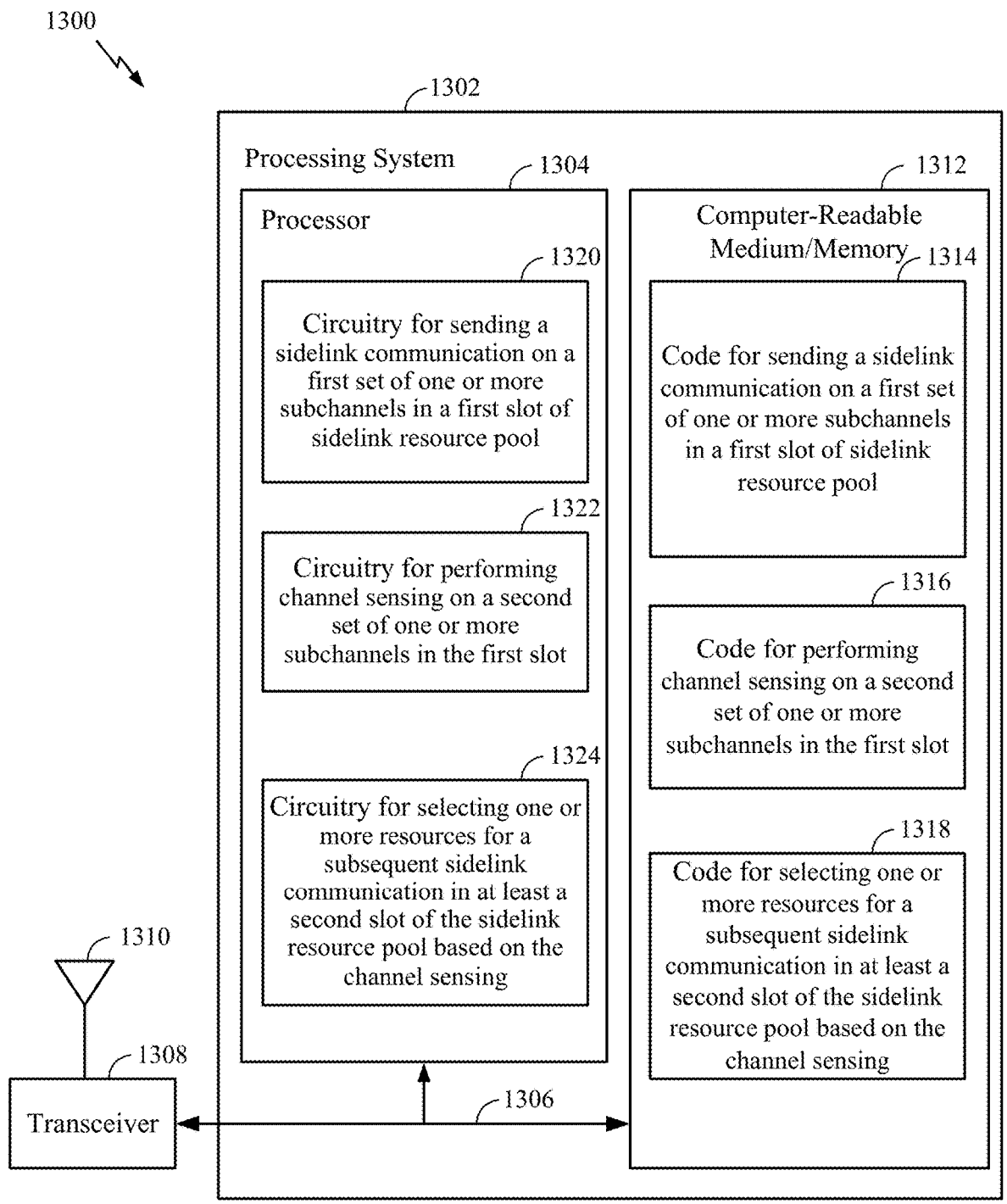
FIG. 13 illustrates communications device that may include various components configured to perform the operations illustrated in FIG. 10, in accordance with certain aspects of the present disclosure.

FIG. 13 illustrates a communications device 1300 that may include various components (e.g., corresponding to means-plus-function components) configured to perform operations for the techniques disclosed herein, such as the operations 1000 illustrated in FIG. 10. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations 1000 illustrated in FIG. 10, or other operations described herein. In certain aspects, computer-readable medium/memory 1312 stores code 1314 for outputting a sidelink communication for transmission on a first set of one or more subchannels in a first slot of sidelink resource pool; code 1316 for performing channel sensing on a second set of one or more subchannels in the first slot; and code 1318 for selecting one or more resources for a subsequent sidelink communication in at least a second slot of the sidelink resource pool based on the channel sensing. In certain aspects, the processor 1304 has circuitry configured to implement the code stored in the computer-readable medium/memory 1312. The processor 1304 includes circuitry 1320 for outputting a sidelink communication for transmission on a first set of one or more subchannels in a first slot of sidelink resource pool; circuitry 1322 for performing channel sensing on a second set of one or more subchannels in the first slot; and circuitry 1324 for selecting one or more resources for a subsequent sidelink communication in at least a second slot of the sidelink resource pool based on the channel sensing.

EXAMPLE ASPECTS

Aspect 1: A method for wireless communications by a first user equipment (UE), comprising: sending a sidelink communication on a first set of one or more subchannels in a first slot of sidelink resource pool; performing channel sensing on a second set of one or more subchannels in the first slot; and selecting one or more resources for a subsequent sidelink communication in at least a second slot of the sidelink resource pool based on the channel sensing.

Aspect 2: The method of Aspect 1, wherein the selection of one or more resources for the subsequent sidelink communication comprises excluding resources for which the first UE has not performed channel sensing.

Aspect 3: The method of Aspect 2, wherein the exclusion comprises excluding only the resources for which the first UE has not performed channel sensing.

Aspect 4: The method of any one of Aspects 1-3, further comprising excluding, from the second set of one or more subchannels, a third set of one or more subchannels that form a guard band adjacent the first set of one or more subchannels.

Aspect 5: The method of Aspect 4, wherein: the performance of the channel sensing comprises decoding a sidelink control information (SCI) that indicates a reservation of future resources that at least partially overlap with the first set of subchannels or the third set of subchannels; and the selection of the one or more resources for the subsequent sidelink communication comprises assigning a reference signal received power (RSRP) to at least the overlapping future resources based on an RSRP measured for a subchannel on which the SCI was decoded.

Aspect 6: The method of Aspect 5, wherein the assigned RSRP comprises the RSRP measured for the subchannel on which the SCI was decoded.

Aspect 7: The method of any one of Aspects 1-6 wherein the performance of the channel sensing comprises: measuring a reference signal received power (RSRP) for a communication on the second set of subchannels; and adjusting a value of the measured RSRP based on a self-interference power.

Aspect 8: The method of Aspect 7, wherein the self-interference power depends on at least one of a resource block (RB) allocation of the second set of subchannels or a transmit power used to send the sidelink communication on the first set of one or more subchannels.

Aspect 9: The method of any one of Aspects 1-8, wherein: the performance of the channel sensing comprises measuring a reference signal received power (RSRP) for a communication on the second set of subchannels; and the selection of the one or more resources for the subsequent sidelink communication comprises applying a first RSRP threshold for one or more subchannels associated with the first slot and applying a second RSRP threshold for one or more subchannels associated with one or more slots in which there is no sidelink communication sent from the UE.

Aspect 10: The method of Aspect 9, further comprising determining the first RSRP threshold based on at least one of an offset value or the second RSRP threshold.

Aspect 11: A first user equipment, comprising at least one antenna and means for performing the operations of one or more of Aspects 1-10.

Aspect 12: A first user equipment, comprising a transceiver, a memory and at least one processor configured to perform the operations of one or more of Aspects 1-10.

Aspect 13: An apparatus for wireless communications by a first user equipment (UE), comprising: a memory; and at least one processor coupled to the memory, wherein the memory and the at least one processor being configured to output a sidelink communication for transmission on a first set of one or more subchannels in a first slot of sidelink resource pool, perform channel sensing on a second set of one or more subchannels in the first slot, and select one or more resources for a subsequent sidelink communication in at least a second slot of the sidelink resource pool based on the channel sensing.

Aspect 14: A computer-readable medium for wireless communications by a first user equipment, comprising codes executable by an apparatus to: output a sidelink communication for transmission on a first set of one or more subchannels in a first slot of sidelink resource pool; perform channel sensing on a second set of one or more subchannels in the first slot; and select one or more resources for a subsequent sidelink communication in at least a second slot of the sidelink resource pool based on the channel sensing.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIG. 10 may be performed by various processors shown in FIG. 4, such as processors 466, 458, 464, and/or controller/processor 480 of the UE 120*a* (and/or UE 120*b* of FIG. 1).

Means for receiving may include a transceiver, a receiver or at least one antenna and at least one receive processor illustrated in FIG. 2. Means for transmitting, means for re-transmitting, means for sending or means for outputting may include, a transceiver, a transmitter or at least one antenna and at least one transmit processor illustrated in FIG. 2. Means for monitoring, means for selecting, means for combining, means for randomly selecting, means for refraining, means for waiting, and means for performing may include a processing system, which may include one or more processors, such as processors 458, 464 and 466, and/or controller/processor 480 of the UE 120*a* and/or processors 420, 430, 438, and/or controller/processor 440 of the BS 110*a* shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations 1000 described herein and illustrated in FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first user equipment (UE), comprising:

sending a sidelink communication on a first set of one or more subchannels in a first slot of sidelink resource pool;
performing channel sensing on a second set of one or more subchannels in the first slot; and
selecting one or more resources for a subsequent sidelink communication in at least a second slot of the sidelink resource pool based on the channel sensing.

2. The method of claim 1, wherein the selection of one or more resources for the subsequent sidelink communication comprises excluding resources for which the first UE has not performed channel sensing.

3. The method of claim 2, wherein the exclusion comprises excluding only the resources for which the first UE has not performed channel sensing.

4. The method of claim 1, further comprising excluding, from the second set of one or more subchannels, a third set of one or more subchannels that form a guard band adjacent the first set of one or more subchannels.

5. The method of claim 4, wherein:
the performance of the channel sensing comprises decoding a sidelink control information (SCI) that indicates a reservation of future resources that at least partially overlap with the first set of subchannels or the third set of subchannels; and
the selection of the one or more resources for the subsequent sidelink communication comprises assigning a reference signal received power (RSRP) to at least the overlapping future resources based on an RSRP measured for a subchannel on which the SCI was decoded.

6. The method of claim 5, wherein the assigned RSRP comprises the RSRP measured for the subchannel on which the SCI was decoded.

7. The method of claim 1 wherein the performance of the channel sensing comprises:
measuring a reference signal received power (RSRP) for a communication on the second set of subchannels; and
adjusting a value of the measured RSRP based on a self-interference power.

8. The method of claim 7, wherein the self-interference power depends on at least one of a resource block (RB) allocation of the second set of subchannels or a transmit power used to send the sidelink communication on the first set of one or more subchannels.

9. The method of claim 1, wherein:
the performance of the channel sensing comprises measuring a reference signal received power (RSRP) for a communication on the second set of subchannels; and
the selection of the one or more resources for the subsequent sidelink communication comprises applying a first RSRP threshold for one or more subchannels associated with the first slot and applying a second RSRP threshold for one or more subchannels associated with one or more slots in which there is no sidelink communication sent from the UE.

10. The method of claim 9, further comprising determining the first RSRP threshold based on at least one of an offset value or the second RSRP threshold.

11. A first user equipment (UE), comprising:
a transmitter configured to send a sidelink communication on a first set of one or more subchannels in a first slot of sidelink resource pool;
a memory; and
at least one processor coupled to the memory, wherein the memory and the at least one processor being configured to:
perform channel sensing on a second set of one or more subchannels in the first slot; and
select one or more resources for a subsequent sidelink communication in at least a second slot of the sidelink resource pool based on the channel sensing.

12. The first UE of claim 11, wherein the selection of one or more resources for the subsequent sidelink communication comprises excluding resources for which the first UE has not performed channel sensing.

13. The first UE of claim 12, wherein the exclusion comprises excluding only the resources for which the first UE has not performed channel sensing.

14. The first UE of claim 11, wherein the memory and the at least one processor are further configured to exclude, from the second set of one or more subchannels, a third set of one or more subchannels that form a guard band adjacent the first set of one or more subchannels.

15. The first UE of claim 14, wherein:
the performance of the channel sensing comprises decoding a sidelink control information (SCI) that indicates a reservation of future resources that at least partially overlap with the first set of subchannels or the third set of subchannels; and
the selection of the one or more resources for the subsequent sidelink communication comprises assigning a reference signal received power (RSRP) to at least the overlapping future resources based on an RSRP measured for a subchannel on which the SCI was decoded.

16. The first UE of claim 15, wherein the assigned RSRP comprises the RSRP measured for the subchannel on which the SCI was decoded.

17. The first UE of claim 11 wherein the performance of the channel sensing comprises:
measuring a reference signal received power (RSRP) for a communication on the second set of subchannels; and
adjusting a value of the measured RSRP based on a self-interference power.

18. The first UE of claim 17, wherein the self-interference power depends on at least one of a resource block (RB) allocation of the second set of subchannels or a transmit power used to send the sidelink communication on the first set of one or more subchannels.

19. The first UE of claim 11, wherein:
the performance of the channel sensing comprises measuring a reference signal received power (RSRP) for a communication on the second set of subchannels; and
the selection of the one or more resources for the subsequent sidelink communication comprises applying a first RSRP threshold for one or more subchannels associated with the first slot and applying a second RSRP threshold for one or more subchannels associated with one or more slots in which there is no sidelink communication sent from the UE.

20. The first UE of claim 19, wherein the memory and the at least one processor are further configured to determine the first RSRP threshold based on at least one of an offset value or the second RSRP threshold.

21. An apparatus for wireless communications by a first user equipment (UE), comprising:
a memory; and
at least one processor coupled to the memory, wherein the memory and the at least one processor being configured to:
output a sidelink communication for transmission on a first set of one or more subchannels in a first slot of sidelink resource pool;

perform channel sensing on a second set of one or more subchannels in the first slot; and select one or more resources for a subsequent sidelink communication in at least a second slot of the sidelink resource pool based on the channel sensing.

22. The apparatus of claim 21, wherein the selection of one or more resources for the subsequent sidelink communication comprises excluding resources for which the first UE has not performed channel sensing.

23. The apparatus of claim 22, wherein the exclusion comprises excluding only the resources for which the first UE has not performed channel sensing.

24. The apparatus of claim 21, wherein the memory and the at least one processor are further configured to exclude, from the second set of one or more subchannels, a third set of one or more subchannels that form a guard band adjacent the first set of one or more subchannels.

25. The apparatus of claim 24, wherein:
the performance of the channel sensing comprises decoding a sidelink control information (SCI) that indicates a reservation of future resources that at least partially overlap with the first set of subchannels or the third set of subchannels; and
the selection of the one or more resources for the subsequent sidelink communication comprises assigning a reference signal received power (RSRP) to at least the overlapping future resources based on an RSRP measured for a subchannel on which the SCI was decoded.

26. The apparatus of claim 25, wherein the assigned RSRP comprises the RSRP measured for the subchannel on which the SCI was decoded.

27. The apparatus of claim 21 wherein the performance of the channel sensing comprises:
measuring a reference signal received power (RSRP) for a communication on the second set of subchannels; and
adjusting a value of the measured RSRP based on a self-interference power.

28. The apparatus of claim 27, wherein the self-interference power depends on at least one of a resource block (RB) allocation of the second set of subchannels or a transmit power used to send the sidelink communication on the first set of one or more subchannels.

29. The apparatus of claim 21, wherein:
the performance of the channel sensing comprises measuring a reference signal received power (RSRP) for a communication on the second set of subchannels; and
the selection of the one or more resources for the subsequent sidelink communication comprises applying a first RSRP threshold for one or more subchannels associated with the first slot and applying a second RSRP threshold for one or more subchannels associated with one or more slots in which there is no sidelink communication sent from the UE.

30. The apparatus of claim 29, wherein the memory and the at least one processor are further configured to determine the first RSRP threshold based on at least one of an offset value or the second RSRP threshold.

* * * * *